(12) United States Patent
Soder

(10) Patent No.: US 10,730,404 B2
(45) Date of Patent: Aug. 4, 2020

(54) METHOD FOR OPERATING A PRODUCTION PLANT COMPRISING A VEHICLE AND AT LEAST ONE CHARGING POINT, AND PRODUCTION PLANT HAVING A VEHICLE FOR CARRYING OUT THE METHOD

(71) Applicant: SEW-EURODRIVE GMBH & CO. KG, Bruchsal (DE)

(72) Inventor: Johann Soder, Hambrücken (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 16/095,610

(22) PCT Filed: Mar. 28, 2017

(86) PCT No.: PCT/EP2017/025062
§ 371 (c)(1),
(2) Date: Oct. 22, 2018

(87) PCT Pub. No.: WO2017/182130
PCT Pub. Date: Oct. 26, 2017

(65) Prior Publication Data
US 2019/0126778 A1    May 2, 2019

(30) Foreign Application Priority Data
Apr. 22, 2016   (DE) .................. 10 2016 004 971

(51) Int. Cl.
*H02J 7/00*         (2006.01)
*B60M 1/36*         (2006.01)
(Continued)

(52) U.S. Cl.
CPC ............ *B60M 1/36* (2013.01); *B60L 50/40* (2019.02); *B60L 50/50* (2019.02); *B60L 53/12* (2019.02);
(Continued)

(58) Field of Classification Search
CPC ................................ B60M 1/36; B60L 50/50
(Continued)

(56) References Cited

U.S. PATENT DOCUMENTS 10,108,194 B1 * 10/2018 Russell ............. G05D 1/0212
2010/0237709 A1   9/2010 Hall et al.
(Continued)

FOREIGN PATENT DOCUMENTS

DE          19842738 A1    4/2000
JP          2014 236539 A  12/2014
WO      WO 2013116651 A1   8/2013

OTHER PUBLICATIONS

International Search Report dated Jun. 19, 2017, in International Application No. PCT/EP2017/025062 (English-language translation).
(Continued)

*Primary Examiner* — Suchin Parihar
(74) *Attorney, Agent, or Firm* — Hunton Andrews Kurth LLP

(57) ABSTRACT

In a method for operating a production plant having a vehicle and at least one charging point, and in a production plant having a vehicle for carrying out the method: in a first method step, the vehicle drives to the charging point; in a second method step, the vehicle is rotated, in particular with the aid of the omnidirectional drive or the differential drive; in a third method step, the vehicle moves on; and electrical energy is inductively transmitted from the charging point to the vehicle during the second method step.

20 Claims, 1 Drawing Sheet

(51) Int. Cl.
 *B60L 50/50* (2019.01)
 *B60L 50/40* (2019.01)
 *B60L 53/12* (2019.01)
 *B60L 53/30* (2019.01)
(52) U.S. Cl.
 CPC ........... *B60L 53/32* (2019.02); *B60L 2200/44* (2013.01); *Y02P 90/60* (2015.11); *Y02T 10/7005* (2013.01); *Y02T 10/7022* (2013.01); *Y02T 10/7072* (2013.01); *Y02T 90/121* (2013.01); *Y02T 90/122* (2013.01); *Y02T 90/128* (2013.01); *Y02T 90/14* (2013.01)
(58) Field of Classification Search
 USPC ......................................................... 320/108
 See application file for complete search history.

(56) References Cited

U.S. PATENT DOCUMENTS

| | | | | |
|---|---|---|---|---|
| 2015/0214751 A1* | 7/2015 | Niizuma | ................. | B60L 53/36 307/9.1 |
| 2015/0231981 A1* | 8/2015 | Kees | ....................... | B60L 53/36 701/22 |
| 2016/0173740 A1* | 6/2016 | Corby | .................. | G06K 9/6267 348/144 |
| 2017/0225582 A1* | 8/2017 | Augst | ..................... | H02J 50/10 |
| 2017/0357270 A1* | 12/2017 | Russell | ................. | G05D 1/0257 |
| 2018/0186582 A1* | 7/2018 | Borders | ................. | B65G 65/00 |
| 2018/0297677 A1* | 10/2018 | Sakaue | .................. | B63C 11/00 |
| 2019/0194005 A1* | 6/2019 | Shah | ..................... | B66F 9/0755 |

OTHER PUBLICATIONS

Anonymous: "AGV (Automated Guided Vehicle) Systems—AGV Battery Charging |Vahle Electrification", Mar. 27, 2016 (Mar. 27, 2016), https://web.archive.org/web/20160327155349/http://www.vahleinc.com/battery-charging-contacts.html, XP055378870, Retrieved from the Internet <URL:http://www.vahleinc.com/battery-charging-contacts.html> [retrieved on Jun. 6, 2017].

U.S. Appl. No. 62/231,092, filed Jun. 24, 2015.
U.S. Appl. No. 62/302,070, filed Mar. 1, 2016.
International Preliminary Report on Patentability issued in PCT/EP2017/025062 dated Nov. 1, 2018.

* cited by examiner

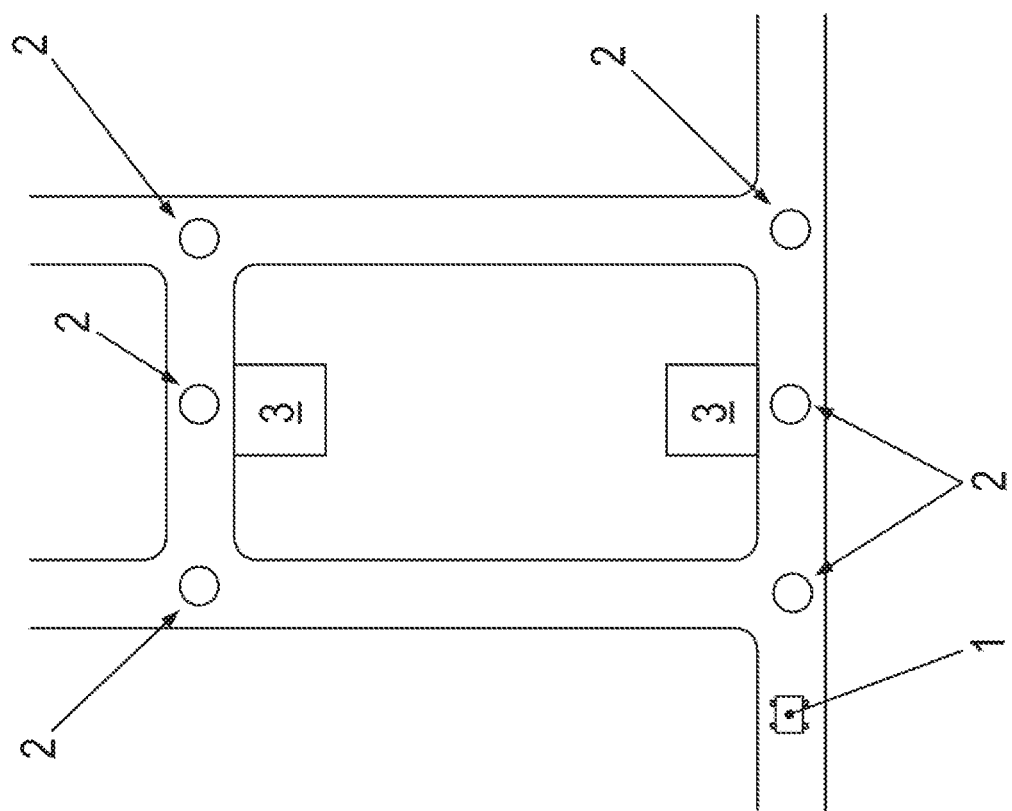

METHOD FOR OPERATING A PRODUCTION PLANT COMPRISING A VEHICLE AND AT LEAST ONE CHARGING POINT, AND PRODUCTION PLANT HAVING A VEHICLE FOR CARRYING OUT THE METHOD

FIELD OF THE INVENTION

The present invention relates to a method for operating a production plant having a vehicle and at least one charging point, and it also relates to a production plant having a vehicle for carrying out said method.

BACKGROUND INFORMATION

Certain production plants have workstations where a respective production step is to be performed.

SUMMARY

Example embodiments of the present invention provide a production plant that requires a low construction outlay for the production plant.

According to an example embodiment of the present invention, in a method for operating a production plant having a vehicle and at least one charging point: in a first method step, the vehicle drives to the charging point; in a second method step, the vehicle is rotated, in particular with the aid of the omnidirectional drive or the differential drive; in a third method step, the vehicle moves on; and electrical energy is inductively transmitted from the charging point to the vehicle during the second method step.

This offers the advantage that the time period of the rotation, that is to say, the change in the driving direction, may be utilized for an inductive energy transmission. In comparison with cornering, i.e. a rotation or a change in the driving direction without a simultaneous locomotion of the vehicle, the time required to reach the destination may possibly be longer, depending on the dimensions. However, a smaller mass may be selected for the vehicle because a smaller energy store than when driving without stopping at the charging point will be sufficient. In addition, there is no need to open the floor over a wide area for the lengthwise installation of a primary conductor; instead, a compact recess for the charging point will be sufficient for the installation of a primary winding in the floor.

According to an example embodiment of the present invention, a production plant includes vehicle for carrying out [[a]] the method, and the charging point has a primary winding, into which a medium-frequency current is impressed.

This offers the advantage that an inductive transmission of electrical energy from the direction of the charging point to the vehicle is able to be performed.

The vehicle may have a secondary winding, in particular on its underside, i.e. the side of the vehicle that faces the floor, in particular, a capacitance is connected to the secondary winding, in series and/or in parallel, such that the resonant frequency of the oscillating circuit formed in this manner corresponds to the frequency of the alternating current impressed into the primary winding. This has the advantage that the smallest possible clearance, and thus a high inductive coupling strength, is achievable. The resonant transmission makes it possible to achieve high efficiency in the inductive transmission.

The vehicle may have an omnidirectional drive, a differential drive, and/or the vehicle is steerable or rotatable without locomotion, in particular in that the vehicle has Mecanum wheels or a tank-tread drive. This has the advantage that a rotation in place is possible, that is to say, a change in the orientation of the vehicle or, in particular, a change in the driving direction of the vehicle, without locomotion. As a result, a pure rotation of the vehicle is present, and the inductive charging is easily carried out with the aid of primary windings, which transmit the electrical power independently of the rotary position of the vehicle. An arrangement of the primary winding and/or the secondary winding, e.g., in the form of a ring winding, may be suitable for this purpose.

The production plant may have workstations to which a respective charging point is allocated and which may be approached by the vehicle, and electrical energy may be inductively transmitted from the respective charging point to the vehicle while the transport goods carried by the vehicle are being processed at the respective workstation. This has the advantage that the vehicle drives to the workstation, stops there over a charging point, and the energy store of the vehicle is able to be charged from the direction of the charging point with the aid of the inductive transmission of electrical power. In other words, while the transport good, in particular the workpiece or the product, transported by the vehicle is processed during this stay at the workstation, the energy store is charged, in particular recharged, with energy. The vehicle then continues on, using for this purpose the energy transmitted at the workstation.

The secondary winding may be electrically connected to the terminal of a power rectifier, the terminal being located on the side of the alternating voltage, and charging of an energy store, from which the electromotoric drive of the vehicle is able to be fed, may be carried out via the terminal of the power rectifier on the direct voltage side. This offers the advantage that the inductively transmitted electrical power is able to be supplied to the energy store, in particular in the form of a direct current.

The energy store may have a double-layer capacitor, in particular an ultracap. This has the advantage that rapid charging is possible, in particular in a matter of seconds. The consumption of the vehicle during its further travel is so low that the energy store makes it possible to supply the required power within minutes.

The production plant may include driving paths provided for the vehicle, in particular a network of driving paths provided for the vehicle, and a charging point may be located in the region of each turn-off, in particular a curve region or an intersection region. This offers the advantage that the vehicle stops over the charging point in order to change the driving direction, so that the secondary winding is properly linked, in particular linked to the greatest extent possible, to the primary winding in an inductive manner. Such a high coupling strength therefore allows for the transmission of considerable power. The time for the change in the driving direction may thus be utilized for an inductive transmission of energy to the vehicle and for charging the energy store with energy.

The respective charging point may have a primary winding, which is situated underneath a cover part across which the vehicle is able to be driven. This offers the advantage of a low installation outlay inasmuch as only a compact recess in the floor has to be provided, and this recess can easily be sealed by a cover that a vehicle is able to cross. The cover is formed of an electrically non-conductive material such as plastic.

A linear conductor to which an alternating current may be applied may be installed along a portion of the driving path provided for the vehicle, in particular between two workstations. This is considered advantageous insofar as an inductive supply of the vehicle is able to take place in addition to the charging points, in particular if long driving paths are involved.

Arranging the primary winding and/or the secondary winding in the form of a ring winding makes it possible to transmit the energy at the charging point independently of the rotation of the vehicle. For this purpose, the windings are disposed in a rotationally symmetrical manner with respect to the axis of rotation.

A further primary conductor may be additionally installed lengthwise between two charging points in each case, in particular such that an inductive energy supply of the vehicle is able to be carried out also within a provided section of a driving path, the further primary conductor particularly being disposed along the connection line or the straight connection line of the two charging points in the plant, in particular, the further primary conductor being set apart from the charging points, in particular, an alternating current, whose frequency corresponds to the frequency of the current impressed into the primary winding, being impressed into the further primary conductor. This offers the advantage that a supply of the vehicle is possible even when the vehicle is in motion.

The upper side of the cover part, i.e. in particular the side facing the vehicle, may be circular, and the ring axis of the primary winding may extend through the center of the circle. As a result, it is possible to provide the primary winding in the form of a circular ring winding whose center point lies exactly underneath the center point of the cover part. The inductively transmittable power is therefore constant when the vehicle rotates over the center point of the cover part since the inductive coupling between the primary winding and the secondary winding is constant.

Further features and aspects of example embodiments of the present invention are described in greater detail below with reference to the Figure.

BRIEF DESCRIPTION OF THE DRAWING

FIG. 1 schematically shows a production plant according to an example embodiment of the present invention.

DETAILED DESCRIPTION

The product to be produced is manufactured in multiple working steps, which are carried out at individual workstations 3.

A vehicle sequentially drives to workstations 3, which are set apart from one another, and during the execution of the individual working step, vehicle 1 stops at respective workstation 3, and is thus able to be inductively supplied with electrical energy, which may be provided by a charging point 2 disposed on the floor of the production plant in each case.

Charging points on the floor of the production plant are also provided at curves or branch-off points such as intersections or turnoffs. Vehicle 1 has omnidirectional wheels or rollers, so that vehicle 1 is rotatable above the charging point. The axis of rotation may extend through the center of gravity of the charging point.

Thus, the charging point may be implemented using a ring winding, which is used as a primary winding that is acted upon by a medium-frequency alternating current. The alternating current thus impressed into the primary winding by a current source generates an alternating magnetic field, which induces a voltage at a secondary winding disposed on vehicle 1. A capacitance is connected to this secondary winding, in series or in parallel, such that the resonant frequency of the oscillating circuit induced in this manner substantially corresponds to the frequency of the alternating current fed into the primary winding. If the secondary winding is arranged as a ring winding whose ring axis includes the pivot point of vehicle 1 rotating over the charging point, or if the secondary winding is arranged at such a size that the projection of the secondary winding into the plane that includes the primary winding encompasses the area included by the ring winding, then the magnetic flux generated by the primary winding induces the voltage at the secondary winding.

The frequency of the alternating current impressed into the primary winding may be between 10 kHz and 1000 kHz.

In other words, when vehicle 1 moves no further during the rotation, a resonant transmission of electrical power is possible independently of the respective angle of rotation.

As illustrated in FIG. 1, these charging points may be situated at the respective locations where a rotation of vehicle 1 takes place. For example, these locations are in the area of a turn-off such as an intersection. In addition, the charging points may be placed at the particular locations where vehicle 1 stops so that a working step may be carried out at a workstation 3, for example.

For instance, the production plant is used for the production of a geared motor. At a workstation 3, for example, the transmission is filled with a synthetic lubricating oil, and at another workstation 3, for example, the transmission is filled with a conventional, e.g., a natural, lubricating oil. For this purpose, the still unfinished transmission is accommodated by vehicle 1 and driven to corresponding workstation 3. Upon its arrival there, vehicle 1 stops, and while the oil is filled in, electrical power is transmitted to the vehicle at the same time.

Vehicle 1 has a position-determination system and is therefore able to determine the actual position of the vehicle, to drive up to the position allocated to corresponding charging point 2 and then to stop there.

Vehicle 1 is equipped with an electromotoric drive, which is able to be supplied from an energy store that has a double-layer capacitor. Such energy stores, which are also referred to as ultracaps, have the ability to rapidly receive large energy quantities, or in other words, to receive high electrical power.

The drive has an electric motor, which is fed by a power inverter able to be supplied from the energy store. The voltage induced at the oscillating circuit or the current able to be brought out of the oscillating circuit is conveyed to a power rectifier whose terminal on the direct voltage side is connected to the energy store. The terminal of the power rectifier on the alternating voltage side is connected to the oscillating circuit.

It is also possible to install a long primary conductor, i.e. especially a linear conductor, along a portion of the driving paths of the production plant, to which a medium-frequency alternating current may be applied. An inductive, i.e. in particular a contact-free, supply of electrical power to vehicle 1 while it is driving is also able to be carried out in this manner. However, this requires an installation of the primary conductor in the floor, meaning that a correspondingly long trench must be created in the floor.

Charging point 2 is therefore not provided in the form of a point in the mathematical sense but rather as a compact system that includes the primary winding disposed in a recess in the floor, as well as a cover over which vehicle 1 may drive and which is situated above the primary winding. The cover and also the primary winding in the floor plane may have a smaller extension than the region between the wheels of vehicle 1. Charging point 2 is consequently the primary-side part of the transmitter.

For example, a primary winding is disposed at the respective charging point, the primary winding being situated on the inner side of the cover part that covers the charging point in the direction of the vehicle and is smoothly connected to a floor that accommodates the charging point, the cover part in particular being arranged in a circular shape. In other words, the cover part does not project from the floor, which means that no edge of the cover part projects from the floor either. This also avoids the risk of accidents because a pedestrian, even one with a shuffling gait, is unable to stumble over the cover part. Since the cover part has a circular shape, the vehicle is able to be positioned in a particularly easy and precise manner. While it is true that the primary winding is also detectable by detecting the inductive coupling, other sensors, e.g., an image evaluation system, also make it possible to rapidly and precisely control the optimal position for the rotary motion, even from a great distance. However, a reliable detection may also be carried out with the aid of other sensors that are situated on the underside of the vehicle. For this purpose, the cover is produced from a material that is detectable by a sensor or it has a particular color that is detectable by a sensor.

Instead of the omnidirectional wheels, vehicle 1 may be equipped with a tank-tread drive or with two wheels that are able to be driven independently of each other, thereby allowing for a corresponding rotation of the vehicle "in place", i.e. over the charging point, because of the different angles of rotation or angular velocities.

At least one of work stations 3 may be arranged as an assembly cell, which in turn has a plurality of working positions that are set apart from one another and which are approached by vehicle 1 in sequence, the vehicle stopping at the respective working position and thus receiving electrical power via a further charging point at that location, while the working step that is to be performed on the product to be manufactured is being carried out.

LIST OF REFERENCE NUMERALS

1 vehicle
2 charging point
3 workstation

The invention claimed is:

1. A method for operating a production plant including a vehicle and at least one charging point, comprising:
    driving the vehicle to the charging point;
    after the driving step, rotating the vehicle with the aid of an omnidirectional drive and/or a differential drive;
    after the rotating step, driving the vehicle from the charging point;
    wherein electrical energy is inductively transmitted from the charging point to the vehicle during the rotating step.

2. A production plant having a vehicle for performing the method according to claim 1, wherein the charging point includes a primary winding into which a medium-frequency current is impressable.

3. The production plant according to claim 2, wherein the vehicle includes a secondary winding.

4. The production plant according to claim 3, wherein a capacitance is connected to the secondary winding, in series and/or in parallel, such that a resonant frequency of a resulting oscillating circuit corresponds to a frequency of alternating current impressed into the primary winding.

5. The production plant according to claim 3, wherein the secondary winding is provided on an underside of the vehicle and/or on a side of the vehicle that faces a floor.

6. The production plant according to claim 2, wherein the vehicle includes an omnidirectional drive, includes a differential drive, and/or is steerable or rotatable without locomotion.

7. The production plant according to claim 6, wherein the vehicle includes Mecanum wheels and/or a tank-tread drive.

8. The production plant according to claim 2, further comprising:
    workstations to which a respective charging point is allocated, the vehicle being adapted to approach the workstations, the charging points adapted to inductively transmit electrical energy to the vehicle while transport goods transported by the vehicle are being processed at the respective workstation.

9. The production plant according to claim 3, wherein the secondary winding is electrically connected to a terminal of a power rectifier on an alternating voltage side, and an energy store, from which an electromotoric drive of the vehicle is suppliable, is chargeable via a terminal of the power rectifier on a direct voltage side.

10. The production plant according to claim 9, wherein the energy store includes a double-layer capacitor and/or an ultracap.

11. The production plant according to claim 2, further comprising driving paths provided for the vehicle and/or a net of driving paths provided for the vehicle, and a charging point being located at each turn-off region, a curve region, and/or an intersection region.

12. The production plant according to claim 2, wherein the primary winding is arranged underneath a cover part across which the vehicle drivable, and/or is arranged on an inner side of a cover part that covers the charging point in a direction of the vehicle and which is smoothly connected to a floor accommodating the charging point.

13. The production plant according to claim 2, further comprising a linear conductor to which an alternating current applicable is installed along a portion of a driving path provided for the vehicle and/or between two workstations.

14. The production plant according to claim 3, wherein the primary winding and/or the secondary winding includes a ring winding.

15. The production plant according to claim 14, wherein a ring axis of the ring winding corresponds to a pivot point during the rotation of the vehicle.

16. The production plant according to claim 2, further comprising a further primary conductor arranged lengthwise between two charging points, an inductive energy supply of the vehicle adapted to be performed within a provided driving path section.

17. The production plant according to claim 16, wherein the further primary conductor is arranged along connection line and/or a straight connection line between the two charging points.

18. The production plant according to claim 16, wherein the further primary conductor is set apart from the charging points.

19. The production plant according to claim 16, wherein an alternating current is impressable into the further primary conductor having a frequency that corresponds to a frequency of current impressed into the primary winding.

20. The production plant according to claim 2, wherein an upper side of a cover part and/or a side of the cover part that faces the vehicle is circular, a ring axis of the primary winding extending through a center point of the circular cover part.

\* \* \* \* \*